US009845867B2

(12) United States Patent
Farges

(10) Patent No.: US 9,845,867 B2
(45) Date of Patent: Dec. 19, 2017

(54) DEVICE FOR SENSING THE LINEAR POSITION OF A TRANSMISSION MEMBER IN THE FORM OF A CABLE ATTACHED TO A LEVER OF A MOTOR VEHICLE GEARBOX

(71) Applicant: DURA AUTOMOTIVE SYSTEMS SAS, Bievres (FR)

(72) Inventor: Thomas Farges, Gometz le Chatel (FR)

(73) Assignee: DURA AUTOMOTIVE SYSTEMS SAS, Bievres (FR)

( * ) Notice: Subject to any disclaimer, the term of this patent is extended or adjusted under 35 U.S.C. 154(b) by 310 days.

(21) Appl. No.: 14/412,157

(22) PCT Filed: Jun. 28, 2013

(86) PCT No.: PCT/FR2013/051523
§ 371 (c)(1),
(2) Date: Dec. 30, 2014

(87) PCT Pub. No.: WO2014/006306
PCT Pub. Date: Jan. 9, 2014

(65) Prior Publication Data
US 2015/0167826 A1    Jun. 18, 2015

(30) Foreign Application Priority Data
Jul. 3, 2012   (FR) ..................... 12 56343

(51) Int. Cl.
*F16H 59/02*    (2006.01)
*F16H 61/36*    (2006.01)
(Continued)

(52) U.S. Cl.
CPC ......... *F16H 59/0217* (2013.01); *F16H 59/70* (2013.01); *F16H 61/36* (2013.01);
(Continued)

(58) Field of Classification Search
USPC .................................... 74/473.15
See application file for complete search history.

(56) References Cited

U.S. PATENT DOCUMENTS 4,488,455 A * 12/1984 Shetler ................ B60W 10/06
477/101
6,867,680 B1   3/2005 Kulle
(Continued)

FOREIGN PATENT DOCUMENTS

DE   10 2009 015 883 A1   10/2010
EP    1 096 177 B1    5/2001
(Continued)

*Primary Examiner* — William Kelleher
*Assistant Examiner* — Gregory Prather
(74) *Attorney, Agent, or Firm* — Seed IP Law Group LLP

(57) ABSTRACT

A device for detecting the position of a lever includes a member being connected on at least one of its ends to a cable end piece that is fitted sliding into a fixed sheath end piece. The device comprises a magnet fitted inside a pipe that constitutes the cable end piece and a Hall Effect Sensor positioned on one part of the sheath end piece in order to detect the movement between the cable end piece and the sheath end piece, which corresponds to a movement of the lever.

6 Claims, 1 Drawing Sheet

(51) Int. Cl.
  *F16H 59/70* (2006.01)
  *G01D 5/14* (2006.01)
  *F16H 59/10* (2006.01)
  *F16H 59/04* (2006.01)

(52) U.S. Cl.
  CPC ........... *G01D 5/145* (2013.01); *F16H 59/044* (2013.01); *F16H 59/105* (2013.01); *Y10T 74/20049* (2015.01)

(56) References Cited

U.S. PATENT DOCUMENTS

| | | | | |
|---|---|---|---|---|
| 7,721,618 B2* | 5/2010 | Takahashi | ............ | F16H 59/105 200/252 |
| 7,750,624 B2 | 7/2010 | Heo et al. | | |
| 8,072,209 B2* | 12/2011 | Jerance | ............ | G01D 5/145 324/207.23 |
| 2004/0035237 A1 | 2/2004 | Matsui et al. | | |
| 2006/0283276 A1 | 12/2006 | Komatsu et al. | | |
| 2007/0040803 A1* | 2/2007 | Dider | ............ | G05G 9/047 345/161 |
| 2007/0216402 A1* | 9/2007 | Blessing | ............ | F16H 59/70 324/207.24 |
| 2008/0078604 A1 | 4/2008 | Ersoy et al. | | |
| 2009/0048066 A1* | 2/2009 | Rouleau | ............ | F16H 59/68 477/156 |
| 2009/0120231 A1* | 5/2009 | Ruhlander | ............ | F16C 1/105 74/502.4 |
| 2010/0282014 A1* | 11/2010 | Panizza | ............ | F16H 59/70 74/473.1 |
| 2010/0289484 A1* | 11/2010 | Quinn | ............ | G01D 5/145 324/207.2 |
| 2010/0294067 A1 | 11/2010 | Bak et al. | | |
| 2011/0025308 A1* | 2/2011 | Kitanaka | ............ | F16H 59/105 324/207.11 |
| 2012/0067154 A1* | 3/2012 | Rouleau | ............ | F16H 61/0213 74/473.15 |
| 2013/0060436 A1* | 3/2013 | Cousins | ............ | F16H 59/44 701/64 |
| 2013/0080001 A1* | 3/2013 | Cousins | ............ | F16H 63/42 701/54 |
| 2013/0300403 A1* | 11/2013 | Benson | ............ | F16H 59/044 324/207.2 |
| 2014/0256509 A1* | 9/2014 | Cousins | ............ | F02N 11/0807 477/99 |

FOREIGN PATENT DOCUMENTS

| | | |
|---|---|---|
| EP | 1 989 505 B1 | 11/2008 |
| EP | 2 078 886 B1 | 7/2009 |
| EP | 2 112 406 A1 | 10/2009 |
| FR | 2 930 309 B1 | 10/2009 |
| FR | 2 956 177 A1 | 8/2011 |

* cited by examiner

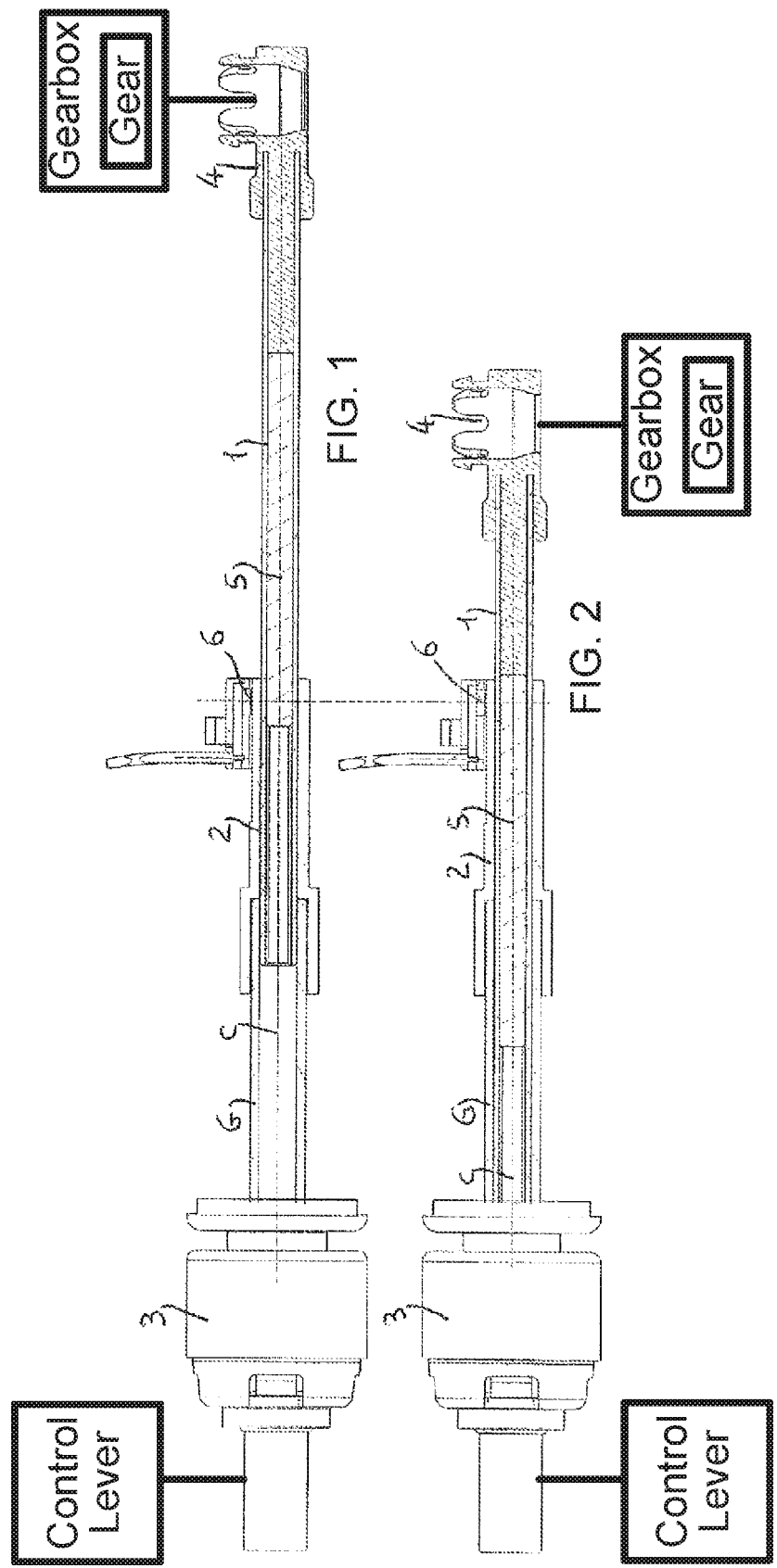

DEVICE FOR SENSING THE LINEAR POSITION OF A TRANSMISSION MEMBER IN THE FORM OF A CABLE ATTACHED TO A LEVER OF A MOTOR VEHICLE GEARBOX

BACKGROUND

Technical Field

The invention relates to the technical sector of gearboxes for motor vehicles and especially concerns a device for detecting the position of a control lever.

Description of the Related Art

Note that for a person skilled in the art, it is common knowledge that the lever is assembled with the capacity for angular displacement in a support housing that is normally fixed in the cab interior of the vehicle. The lever is arranged such that, for example, it is coupled to a system of cables to ensure gears selection control and shifting, either in the case of an automatic transmission or in the case of a mechanical transmission. Knowing the angular position of the lever and its precise spatial position is important for knowing the position of the lever in neutral, especially for vehicles fitted with a STOP and START system normally associated with a manual transmission.

Different solutions have been put forward to perform this function. For example, we can cite the information given in patent FR 2930309, the applicant of which is also the owner, and which pertains to a device for detecting the position of the control lever, which is assembled with the ability to move contrary to the means that are capable of detecting the angular movements of the lever and to send electrical signals to a processing unit. These means comprise a single Hall Effect Sensor fitted opposite a magnet, capable of indicating the different movements and positions of the lever according to the three perpendicular axes X, Y and Z.

A solution of the same type is given in the information of patent FR 2956177, which is also held by the applicant of this patent, according to which the means of detecting the angular movement of the lever comprise a cylindrical magnet for axial magnetization, positioned according to the rotation axis of the lever corresponding to the gear selection, and a sensor placed opposite the said magnet such that the signal remains independent of the position of the lever according to the gear selection axis.

It therefore follows from this state of the art, given for information purposes and in no way limitative, that the position of the lever is detected by measuring the angular movements of the said lever.

According to the state of the art, there is another possibility of measuring the linear movements of the lever, rather than its angular movements. In fact, the gear shifting movements correspond to the exact translations of, for example, the ends of the cable/sheath pair, e.g., between an end piece of a cable and an end piece of a cable and an end piece of a sheath. One of the advantages of this linear movement measurement is that it determines both movements (shifting and selection) differently, which makes it possible to measure only one of them, e.g., only the selection movement is required for detecting the neutral.

The possibility of detecting a linear movement is, for example, given in the patent EP 2078886, which concerns a transmission control device, in particular for the transmission of a motor vehicle, with a system for identifying the selected gear. According to the information given in this patent, the proposed solution involves the use of a specially designed linear position sensor in order to detect the linear position of a mobile reference element that is rigidly connected to monitor a translation movement with, for example, an end piece of a cable. This solution is relatively complex as it requires, as indicated, a specific linear position sensor, while also requiring relatively significant space, which is not always compatible with the environment of a gearbox.

The EP 1096177 patent provides general information on the detection of linear movement by a cable and a sheath using an electrical sensor that is formed by multiple coils wound around a support. However, this patent does not give any information on the manner in which such a movement is detected.

From this state of the art, the problem that this invention seeks to solve is to use magnetic technology with the purpose of detecting the linear position of a transmission member such as a cable connected to the lever in order to detect the position of the said lever, at least one of the ends of the transmission member being connected to a fixed end piece sliding into an end piece of a fixed sheath.

BRIEF SUMMARY

According to the invention, the problem encountered and then solved by the device comprises a magnet fitted inside a pipe that constitutes the cable end piece and a Hall Effect Sensor positioned on one part of the sheath end piece in order to detect the movement between the cable end piece and the sheath end piece, which corresponds to a movement of the said lever.

These characteristics thus help in detecting the position of a gearbox control lever by measuring the position of an end piece of the cable with respect to the end piece of the sheath.

According to another characteristic, the member is a cable fitted between the lever and the parts of the gearbox, for selecting the said gears.

Preferably, the magnet is a permanent magnet, the magnetization direction of which varies linearly or sinusoidally depending on the direction of movement of the end piece.

From the basic characteristics of the invention, the magnet is either fitted inside the end piece of the cable located next to the lever, or it is fitted inside the end piece of the cable located next to the gearbox.

Note that the magnet may either be inserted into the pipe or molded from a casting inside the pipe.

BRIEF DESCRIPTION OF THE SEVERAL VIEWS OF THE DRAWINGS

The invention is explained in more detail hereinafter, with the help of the figures given in the annex, in which:

FIGS. 1 and 2 are schematic, sectional views showing the principle of the linear measurement of the cable end piece with respect to the sheath end piece.

DETAILED DESCRIPTION

Bear in mind that the lever (not shown) for controlling gear shifting and selection is assembled with angular movement capacity in a support housing. The foot of the lever is connected to the control cables, which are themselves connected to the corresponding members of the gearbox. One of these cables corresponds to the gear selection whereas the other cable corresponds to gear shifting. Always in a known manner, these cables (C) are assembled sliding into a sheath (G) and are interdependent with a cable end piece (1) that is assembled sliding into a sheath end piece (2). The sheath (G) has a coupling sleeve (3) with, for example, a part of the lever support. The end of the cable end piece (1) is also fixed to a coupling member (4) with a part of the gearbox. These different solutions are not described in detail as they are known perfectly by the person skilled in the art.

As indicated, the purpose is to detect the position of a gearbox control, i.e., the position of the lever, by measuring the linear position of the cable end piece (1) with respect to the sheath end piece (2). For this purpose, according to a basic characteristic of the invention, the device for sensing this liner position comprises a magnet (5) fitted inside the cable end piece (1) in the form of a pipe. The bore of the pipe (1) is therefore used for setting the magnet (5) in place. The magnet (5) may either simply be inserted into the pipe, or molded from a casting inside the pipe. Note that this magnet (5) may preferably be a permanent magnet, the direction of which varies linearly or sinusoidally depending on the direction of movement of the end piece (1). This characteristic of the magnet is shown, for example, in the information given in patent EP 1989505.

In combination with the magnet (5), a Hall Effect Sensor (6) is positioned on a part of the sheath end piece (2) in order to detect, as explained before, the movement between the cable end piece (1) and the sheath end piece (2) corresponding to a movement of the lever.

Preferably, the magnet (5) is fitted in the cable end piece (1) corresponding to the gear selection cable.

Note that the magnet (5) may be fitted inside the cable end piece that is located either next to the lever or next to the gearbox.

The advantages are quite evident from the description.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for sensing the linear position of a transmission member, comprising:
   a cable attached to a control lever of a motor vehicle gearbox to detect a position of the control lever,
   wherein the transmission member is connected on at least one of its ends to an end piece of the cable, the end piece of the cable fitted slidably within a fixed sheath,
   wherein the end piece of the cable comprises a pipe and a magnet fitted inside the pipe,
   wherein the magnet is a permanent magnet and a magnetization direction of the magnet varies linearly or sinusoidally depending on the direction of the movement between the end piece of the cable and the fixed sheath, and
   wherein a Hall Effect Sensor is positioned on the fixed sheath to detect movement between the end piece of the cable and the fixed sheath, the movement corresponding to a change in position of the control lever.

2. The device according to claim 1, wherein the transmission member is fitted between the control lever and the gearbox, for selecting a gear of the gearbox.

3. The device according to claim 1, wherein the magnet is fitted inside the end piece of the cable at a position located next to the control lever.

4. The device according to claim 1, wherein the magnet is fitted inside the end piece of the cable at a position located next to the gearbox.

5. The device according to claim 1, wherein the magnet is a product of having been inserted into the pipe.

6. The device according to claim 1, wherein the magnet is a product of having been molded from a casting inside the pipe.

* * * * *